(12) United States Patent
Song et al.

(10) Patent No.: US 12,474,319 B1
(45) Date of Patent: Nov. 18, 2025

(54) PHYSICAL SIMULATION EXPERIMENT SYSTEM FOR VAPOR-LIQUID MULTIPHASE SEEPAGE IN UNDERGROUND GAS STORAGE FACILITY IN DEPLETED GAS RESERVOIR

(71) Applicant: Institute of Rock and Soil Mechanics, Chinese Academy of Sciences, Wuhan (CN)

(72) Inventors: Rui Song, Wuhan (CN); Yujia Song, Wuhan (CN); Jianjun Liu, Wuhan (CN); Chunhe Yang, Wuhan (CN)

(73) Assignee: Institute of Rock and Soil Mechanics, Chinese Academy of Sciences, Wuhan (CN)

( * ) Notice: Subject to any disclaimer, the term of this patent is extended or adjusted under 35 U.S.C. 154(b) by 0 days.

(21) Appl. No.: 19/202,092

(22) Filed: May 8, 2025

(30) Foreign Application Priority Data

Jul. 8, 2024 (CN) .......................... 202410903873.7

(51) Int. Cl.
  *G01N 33/24* (2006.01)
  *G01N 3/12* (2006.01)
  *G01N 33/00* (2006.01)

(52) U.S. Cl.
  CPC ............... *G01N 33/24* (2013.01); *G01N 3/12* (2013.01); *G01N 33/0009* (2013.01); *G01N 2203/0019* (2013.01); *G01N 2203/0048* (2013.01)

(58) Field of Classification Search
  CPC ...... G01N 33/24; G01N 33/0009; G01N 3/12; G01N 2203/0019; G01N 2203/0048; G01N 2203/0256
  See application file for complete search history.

(56) References Cited

U.S. PATENT DOCUMENTS

| | | | |
|---|---|---|---|
| 11,940,367 B2 * | 3/2024 | Yue | G01N 33/24 |
| 2017/0003263 A1 * | 1/2017 | Huang | G01N 33/24 |
| 2019/0265138 A1 * | 8/2019 | Ma | G01N 3/10 |
| 2022/0091012 A1 * | 3/2022 | Xu | G01N 15/0806 |

FOREIGN PATENT DOCUMENTS

| | | | | |
|---|---|---|---|---|
| CN | 105510142 A | | 4/2016 | |
| CN | 108318666 | * | 7/2018 | |
| CN | 111579463 A | | 8/2020 | |
| CN | 212391593 U | | 1/2021 | |
| WO | WO-2024041145 A1 | * | 2/2024 | ............... G01N 3/12 |

* cited by examiner

*Primary Examiner* — Carib A Oquendo
(74) *Attorney, Agent, or Firm* — Nitin Kaushik

(57) ABSTRACT

Disclosed is a physical simulation experiment system for vapor-liquid multiphase seepage in an underground gas storage facility in a depleted gas reservoir, including: a rock sample sealing, heating, and insulation system, a triaxial stress and confining pressure loading system, an oil-gas-water injection and pore pressure supply system, a vapor-liquid-solid three-phase separation and measurement system, an optical micro/nanofiber gas detection and monitoring system, a distributed fiber optic sensing system, and a gas supply and leakage alarm system, where the rock sample sealing, heating, and insulation system is used for accommodating and heating a rock sample; and the oil-gas-water injection and pore pressure supply system performs oil-gas-water injection into the rock sample and pore pressure maintenance. The present application aims to overcome the bottleneck problem of evaluating the dynamic sealing integrity of underground gas storage under alternating loads caused by injection and withdrawal.

7 Claims, 5 Drawing Sheets

PHYSICAL SIMULATION EXPERIMENT SYSTEM FOR VAPOR-LIQUID MULTIPHASE SEEPAGE IN UNDERGROUND GAS STORAGE FACILITY IN DEPLETED GAS RESERVOIR

CROSS-REFERENCE TO RELATED APPLICATIONS

The application claims priority to Chinese patent application No. 2024109038737, filed on Jul. 8, 2024, the entire contents of which are incorporated herein by reference.

TECHNICAL FIELD

The present invention relates to the technical field of underground gas storage facilities in depleted gas reservoirs, and in particular, to a physical simulation experiment system for vapor-liquid multiphase seepage in an underground gas storage facility in a depleted gas reservoir.

BACKGROUND

Underground gas storage (UGS) facilities are critical infrastructure for ensuring national energy security, with depleted gas reservoirs being the main type of UGS in China. These UGS facilities commonly feature complex edge and bottom aquifer systems, and the complicated fluid distribution caused by vapor-liquid interactions directly impacts storage capacity, injection and withdrawal efficiency, and operational safety.

The geological structure of UGS facilities is complex. The sealing integrity of the UGS, along with its dynamic evolution, significantly impacts site selection, construction, and safe operation. The sealing integrity of stratigraphic trap is a critical factor for the safe operation of UGS facilities. Intense injection and withdrawal operations cause periodic disturbances in the in-situ stress, which can easily result in dynamic changes in the sealing integrity. The rapid changes in pore pressure during injection and withdrawal and induced stress field disturbances are major causes of tensile and shear failure in the stratigraphic trap of gas reservoir (including caprocks and faults).

Moreover, the injection and withdrawal processes in UGS wells differ significantly from those in conventional oil and gas reservoir development wells. During injection and withdrawal, the tubular string is subjected to prolonged alternating loads. The high-rate injection and withdrawal of natural gas expose the tubular string to additional loads, such as ballooning, temperature fluctuations, and formation expansion and contraction. Under these complex operating conditions, the sealing integrity and safety of the wellbore and its cement sheath are severely challenged. Meanwhile, the complex operating conditions of the storage wellbore may also lead to safety issues such as wellbore deformation, collapse, sand production, and fluid channeling, which are critical to the construction and operation of UGS facilities.

However, there is currently no established theoretical framework or methodology, either domestically or internationally, for effectively predicting the sealing integrity of faults, caprocks, wellbores, and reservoirs in UGS facilities. Therefore, it is imperative to overcome the bottleneck problem of evaluating the dynamic sealing integrity of UGS facilities in depleted gas reservoirs under alternating loads caused by injection and withdrawal, so as to guide the scientific site selection and design of UGS facilities.

SUMMARY

To solve the aforementioned problems, the present application provides a physical simulation experiment system and method for vapor-liquid multiphase seepage in a UGS facility in a depleted gas reservoir, which aims to overcome the bottleneck problem of evaluating the dynamic sealing integrity of UGS facilities in depleted gas reservoirs under alternating loads caused by injection and withdrawal, thereby guiding the scientific site selection and design of UGS facilities. The technical solution is described as follows:

the present application provides a physical simulation experiment system for vapor-liquid multiphase seepage in a UGS facility in a depleted gas reservoir, including: a rock sample sealing, heating, and insulation system, a triaxial stress and confining pressure loading system, an oil-gas-water injection and pore pressure supply system, a vapor-liquid-solid three-phase separation and measurement system, an optical micro/nanofiber gas detection and monitoring system, a distributed fiber optic sensing system, and a gas supply and leakage alarm system, where the rock sample sealing, heating, and insulation system includes a rock sample sealing unit for accommodating a rock sample and a heating and insulation unit for heating the rock sample; the triaxial stress and confining pressure loading system includes a triaxial stress loading unit for applying triaxial stress to the rock sample and a confining pressure loading unit for applying a confining pressure to the rock sample; the oil-gas-water injection and pore pressure supply system is connected to an inlet end of the rock sample via a pipeline and includes a vapor-phase injection unit and a liquid-phase injection unit to perform oil-gas-water three-phase injection into the rock sample; the vapor-liquid-solid three-phase separation and measurement system is connected to an outlet end of the rock sample via a pipeline and includes a back-pressure unit, a solid separation and measurement unit, and a vapor-liquid separation and measurement unit; the optical micro/nanofiber gas detection and monitoring system is configured to detect leakage of specified gases; the distributed fiber optic sensing system is configured to monitor and record internal deformation and fracture initiation of the rock sample during a loading process; and the gas supply and leakage alarm system is configured to provide safe and reliable centralized gas supply.

For example, in an embodiment of the physical simulation experiment system for vapor-liquid multiphase seepage in the UGS facility in the depleted gas reservoir, the rock sample sealing unit includes a main pressure chamber, a rock sample rubber sleeve, and loading plates, where the main pressure chamber has a central cavity for accommodating the rock sample and providing a confining pressure environment for the rock sample; the rock sample rubber sleeve is fitted around an outer wall of the rock sample to seal the rock sample; and the loading plates are arranged around the rock sample respectively and press against the rock sample rubber sleeve on the outer wall of the rock sample.

For example, in an embodiment of the physical simulation experiment system for vapor-liquid multiphase seepage in the UGS facility in the depleted gas reservoir, the heating and insulation unit includes heating rods and a flexible insulation jacket, where the heating rods are embedded around an interior of the main pressure chamber to heat the main pressure chamber and transfer heat to the rock sample, and the flexible insulation jacket is wrapped around an exterior of the main pressure chamber to provide thermal insulation and temperature compensation for the main pressure chamber.

For example, in an embodiment of the physical simulation experiment system for vapor-liquid multiphase seepage in the UGS facility in the depleted gas reservoir, the triaxial stress loading unit includes loading cylinders positioned around the rock sample, a servo loading pump that provides a power source for the loading cylinders, a servo oil source that offers pre-pressurization for axial loading, a servo valve that controls a hydraulic pressure of the loading cylinders, a directional control valve that controls a piston movement direction of the loading cylinders, a displacement sensor that controls displacement of the loading cylinders, and an air compressor that supplies a low-pressure power to reset pistons of the loading cylinders; loading heads of the loading cylinders press against the loading plates around the rock sample respectively; and the confining pressure loading unit includes a high-precision constant flow/pressure pump connected to the main pressure chamber via a pipeline to provide a constant pressure within the main pressure chamber, thereby applying a confining pressure to the rock sample.

For example, in an embodiment of the physical simulation experiment system for vapor-liquid multiphase seepage in the UGS facility in the depleted gas reservoir, the vapor-phase injection unit is connected to the rock sample via a pipeline and includes a gas booster pump set connected via a pipeline for supplying a high-pressure gas at an input end, a high-pressure gas storage vessel for storing the high-pressure gas, an air compressor for supplying power to the gas booster pump set, a pneumatic pressure controller for controlling a gas pressure, and a gas flow controller for controlling a gas flow rate.

For example, in an embodiment of the physical simulation experiment system for vapor-liquid multiphase seepage in the UGS facility in the depleted gas reservoir, the liquid-phase injection unit is connected to the rock sample via a pipeline and includes a liquid constant flow/pressure pump and a piston container, both connected via a pipeline, where the piston container is configured to isolate a working fluid from an injected fluid.

For example, in an embodiment of the physical simulation experiment system for vapor-liquid multiphase seepage in the UGS facility in the depleted gas reservoir, the back-pressure unit includes a back-pressure pump, a back-pressure container, and a back-pressure valve, all connected via a pipeline; the solid separation and measurement unit is disposed between the outlet end of the rock sample and the back-pressure valve and includes a solid collection and measurement container for separating solids; and the vapor-liquid separation and measurement unit is connected to the back-pressure valve and includes a vapor-liquid separator for performing vapor-liquid separation on a fluid from the outlet end of the rock sample, where a separated vapor is discharged through a top outlet of the vapor-liquid separator and passes through a drying tank to enter either a high-speed or low-speed gas flow meter for vapor-phase flow measurement, a separated liquid is discharged through a bottom outlet of the vapor-liquid separator and passes through an oil-water separation tube to enter either an oil-phase metering pump for oil-phase flow measurement or a water-phase metering pump for water-phase flow measurement, and an oil-water interface detector is arranged on the oil-water separation tube.

For example, in an embodiment of the physical simulation experiment system for vapor-liquid multiphase seepage in the UGS facility in the depleted gas reservoir, the optical micro/nanofiber gas detection and monitoring system includes a gas probe arranged inside the rock sample and a signal conditioner electrically connected to the gas probe.

For example, in an embodiment of the physical simulation experiment system for vapor-liquid multiphase seepage in the UGS facility in the depleted gas reservoir, the distributed fiber optic sensing system includes a light source, a coupler, a detector, and optical fibers, all connected electrically, and the optical fibers are embedded inside the rock sample.

For example, in an embodiment of the physical simulation experiment system for vapor-liquid multiphase seepage in the UGS facility in the depleted gas reservoir, the gas supply and leakage alarm system includes a gas cylinder rack for holding gas cylinders, an electromagnetic valve arranged on a gas cylinder outlet pipeline, and a gas monitor, temperature/pressure sensors, a video monitor, a central monitoring server, an alarm, ventilation equipment, and fire extinguishing equipment, all connected to the electromagnetic valve via wiring, and an electrostatic protection device is arranged in a gas cylinder storage room.

The beneficial effects of the physical simulation experiment system for vapor-liquid multiphase seepage in the UGS facility in the depleted gas reservoir provided by some embodiments of the present application are as follows: first, the present application address the current gap in China that there is no relatively comprehensive large-scale triaxial multiphase, multicomponent, and complex multi-field coupling experiment system for UGS facility development, thereby solving the technical problem of being unable to meet the physical simulation experiment requirements for the operating conditions of complex geological structures under multi-cycle injection and withdrawal in UGS facilities in depleted gas reservoirs; second, the present application is utilized to conduct a variety of experiments, including multiphase fluid injection/detection and stress-deformation monitoring under triaxial stress conditions on large-scale rock samples, and holds significant scientific importance and value for revealing the intrinsic mechanisms of the following issues during the injection and withdrawal processes in UGS facilities: migration, miscibility, displacement, and distribution of multiphase fluids in heterogeneous and discontinuous formations, mixing and leakage of gas components, dynamic stability and failure of geological bodies with complex internal structures, sudden changes in flow characteristics, as well as security issues related to the deformation and collapse of key wellbore components such as casings, perforation tunnels, and cement rings, sand production from the wellbore, and fluid channeling. The present application not only addresses critical scientific challenges at the forefront of deep rock mechanics but also represents a major issue urgently needing resolution. It holds great significance for advancing China's UGS facility construction and operation capabilities and promoting disciplinary development.

BRIEF DESCRIPTION OF THE DRAWINGS

To describe technical solutions in the embodiments of the specification or in the prior art more clearly, the following briefly describes the accompanying drawings needed for describing the embodiments. Apparently, the accompanying drawings in the following description show only some embodiments of the present application, and those of ordinary skill in the art may further derive other accompanying drawings from these accompanying drawings without creative efforts.

DETAILED DESCRIPTION OF THE EMBODIMENTS

The technical solutions in the embodiments of the present application are clearly and completely described below with reference to the accompanying drawings in the embodiments of the present application. Apparently, the described embodiments are only some rather than all of the embodiments of the present application. All other embodiments obtained by a person of ordinary skill in the art based on the embodiments of the present application without creative efforts shall fall within the protection scope of the present application.

Unless otherwise defined, the technical terms or scientific terms used herein shall have the same meaning as that commonly understood by a person of ordinary skill in the art of the present application. As used herein, "first", "second", and the like do not indicate any sequence, quantity, or importance, but are only used to distinguish different components. As used herein, "include", "comprise", and the like mean that an element or item appearing before the word covers an element, an item, or an equivalent thereof listed after the word without excluding other elements or items. As used herein, "connection", "connected", and the like are not limited to a physical or mechanical connection but may include a direct or indirect electrical connection. As used herein, "up", "down", "left", "right", and the like are only used to represent a relative positional relationship, and when an absolute position of a described object changes, the relative positional relationship may also change accordingly.

Figure 1:
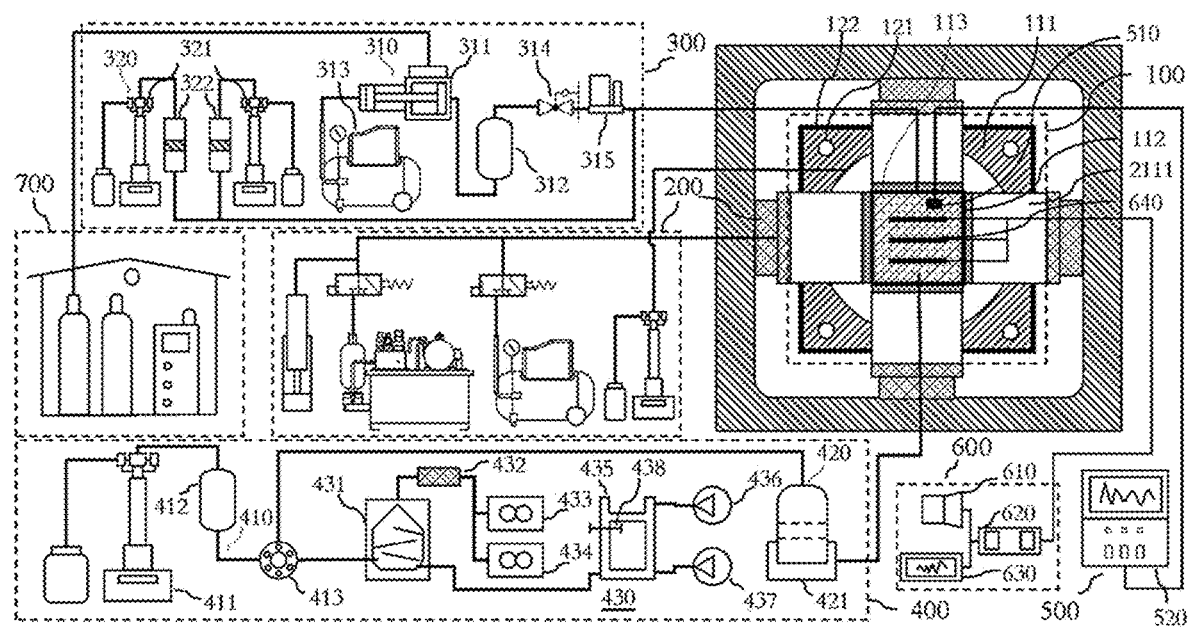
FIG. 1 is a schematic structural diagram of a physical simulation experiment system for vapor-liquid multiphase seepage in a UGS facility in a depleted gas reservoir according to the present application.

The present application provides a physical simulation experiment system for vapor-liquid multiphase seepage in a UGS facility in a depleted gas reservoir, as shown in FIG. 1, including: a rock sample sealing, heating, and insulation system 100, a triaxial stress and confining pressure loading system 200, an oil-gas-water injection and pore pressure supply system 300, a vapor-liquid-solid three-phase separation and measurement system 400, an optical micro/nanofiber gas detection and monitoring system 500, a distributed fiber optic sensing system 600, and a gas supply and leakage alarm system 700, where the rock sample sealing, heating, and insulation system 100 includes a rock sample sealing unit 110 for accommodating a rock sample and a heating and insulation unit 120 for heating the rock sample; the triaxial stress and confining pressure loading system 200 includes a triaxial stress loading unit 210 for applying triaxial stress to the rock sample and a confining pressure loading unit 220 for applying a confining pressure to the rock sample; the oil-gas-water injection and pore pressure supply system 300 is connected to an inlet end of the rock sample via a pipeline and includes a vapor-phase injection unit 310 and a liquid-phase injection unit 320 to perform oil-gas-water three-phase injection into the rock sample; the vapor-liquid-solid three-phase separation and measurement system 400 is connected to an outlet end of the rock sample via a pipeline and includes a back-pressure unit 410, a solid separation and measurement unit 420, and a vapor-liquid separation and measurement unit 430; the optical micro/nanofiber gas detection and monitoring system 500 is configured to detect leakage of specified gases; the distributed fiber optic sensing system 600 is configured to monitor and record internal deformation and fracture initiation of the rock sample during a loading process; and the gas supply and leakage alarm system 700 is configured to provide centralized gas supply.

The rock sample sealing, heating, and insulation system 100 is configured to provide a sealing condition for applying a pore pressure to the rock sample, thereby preventing pore fluids from leaking out at the boundaries of the rock sample, and to provide a heating and constant temperature environment for the rock sample. The rock sample sealing, heating, and insulation system 100 consists of two units: the rock sample sealing unit 110 and the heating and insulation unit 120.

Figure 2:
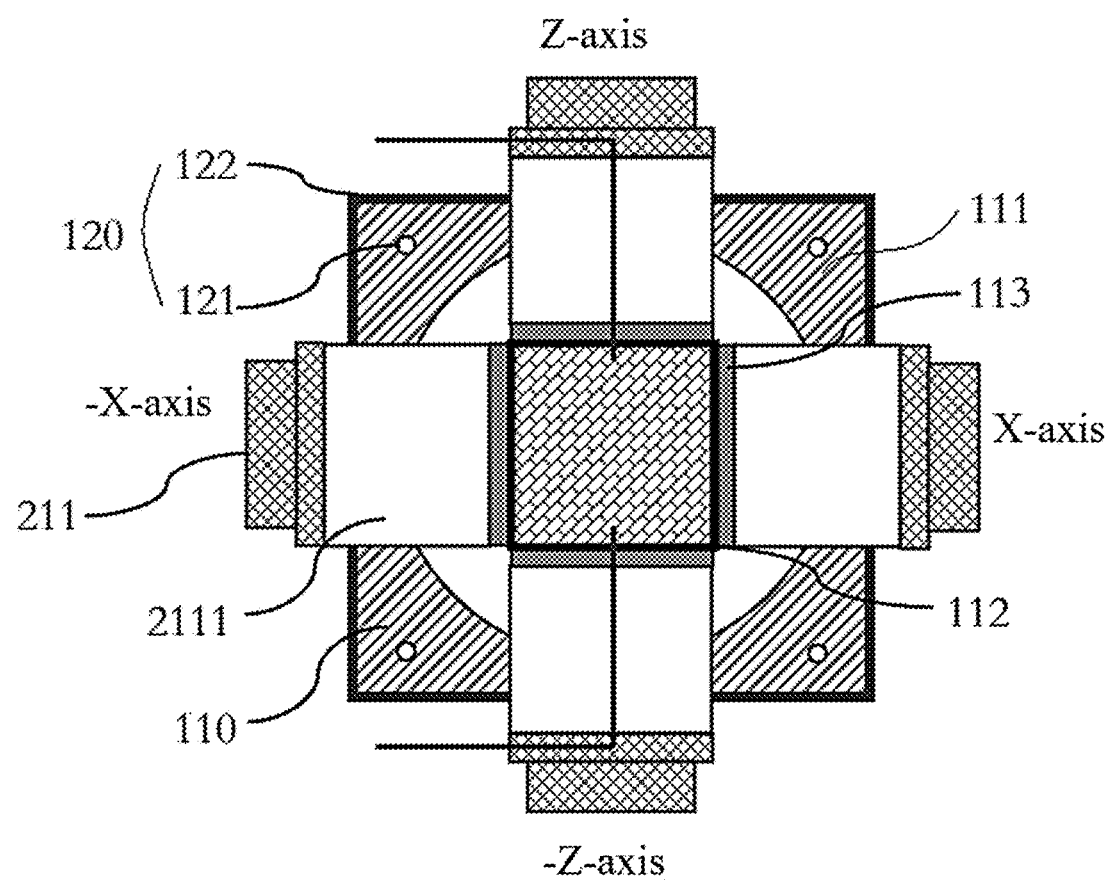
FIG. 2 is a front view of structures of sample sealing, heating, and insulation units according to the present application.
Figure 3:
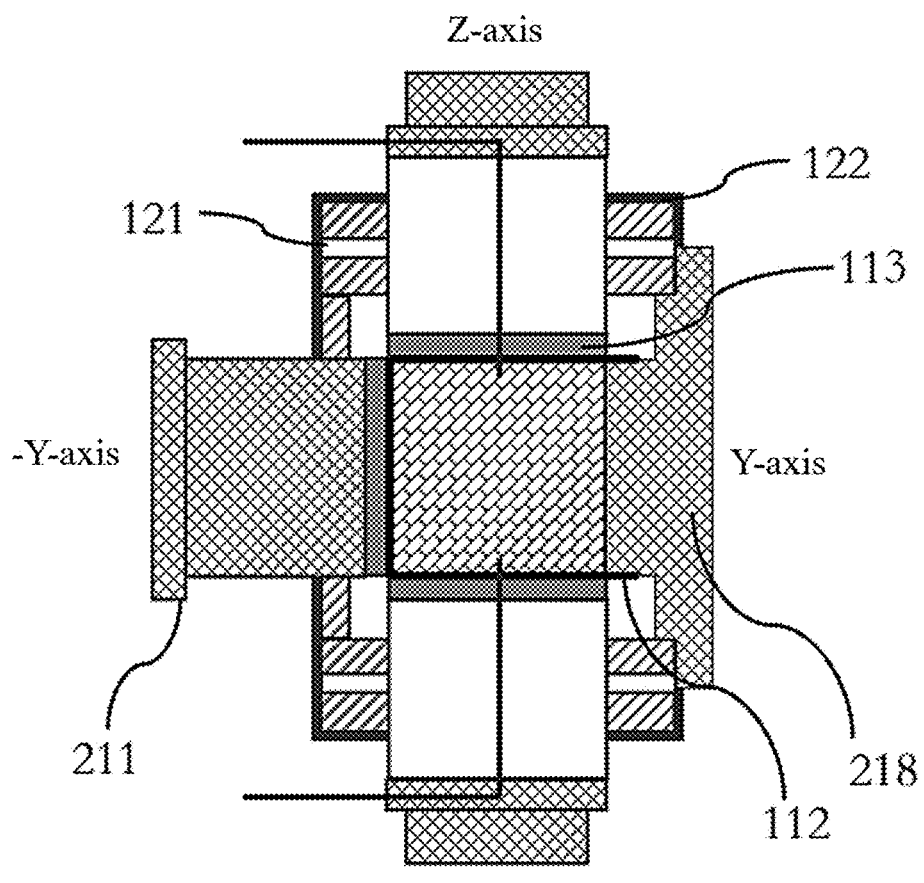
FIG. 3 is a side view of structures of sample sealing, heating, and insulation units according to the present application.

For example, in an embodiment of the physical simulation experiment system for vapor-liquid multiphase seepage in the UGS facility in the depleted gas reservoir, as shown in FIGS. 1-3, the rock sample sealing unit 110 includes a main pressure chamber 111, a rock sample rubber sleeve 112, and loading plates 113, where the main pressure chamber 111 has a central cavity for accommodating the rock sample and providing a confining pressure environment for the rock sample; the rock sample rubber sleeve 112 is fitted around an outer wall of the rock sample to seal the rock sample; and the loading plates 113 are arranged around the rock sample respectively and press against the rock sample rubber sleeve 112 on the outer wall of the rock sample.

The loading plates 113 are pre-equipped with interfaces for gas and fluid injection as well as for testing instruments, meeting the experimental requirements of pore pressure application and testing. By arranging the main pressure chamber 111 around the rock sample, it provides a confining pressure environment for the rock sample and also prevents rupture of the rock sample rubber sleeve 112.

Specifically, the main pressure chamber 111 is made of high-strength alloy 42CrMo and mainly configured to accommodate the rock sample to carry out a multiphase seepage test and apply a confining pressure to the rock sample. Through mechanical verification and analysis, it has been confirmed that the component fully meets the material yield strength criteria when subjected to an overall pressure of 70 MPa. The rock sample rubber sleeve 112 is mainly configured to seal the rock sample to provide a guarantee for the subsequent seepage experiment. The rock sample rubber sleeve 112 features a square five-face structure, which is convenient for installation and offers reliable sealing performance. The sleeve is made of fluoroelastomer, suitable for working below 200° C. The loading plates 113 are made of 2Cr13 and connected to corresponding loading heads 2111. During an experiment, the loading plates 113 come into direct contact with the rock sample rubber sleeve 112. An injection port is designed between the two oppositely arranged front and rear loading plates 113 to facilitate the oil-gas-water multiphase injection and seepage experiment.

For example, in an embodiment of the physical simulation experiment system for vapor-liquid multiphase seepage in the UGS facility in the depleted gas reservoir, as shown in FIGS. 1-3, the heating and insulation unit 120 includes heating rods 121 and a flexible insulation jacket 122, where the heating rods 121 are embedded around an interior of the main pressure chamber 111 to heat the main pressure chamber 111 and transfer heat to the rock sample, and the flexible insulation jacket 122 is wrapped around an exterior of the main pressure chamber 111 to provide thermal insulation and temperature compensation for the main pressure chamber 111.

Specifically, heating rod mounting holes are arranged near the four corners inside the main pressure chamber 111, with the heating rods 121 embedded within these holes. During an experiment, a confining pressure is applied to the rock sample in an oil bath manner. The main pressure chamber 111 is heated by the heating rods 121 arranged thereon, which in turn heats the oil and transfers heat to the rock sample. The exterior of the main pressure chamber 111 is wrapped with the flexible insulation jacket 122, which provides insulation and temperature compensation for the entire main pressure chamber 111, thereby enabling a maximum test temperature of 200° C. A temperature compensation and control system is further arranged to achieve good heating and insulation performance.

Figure 4:
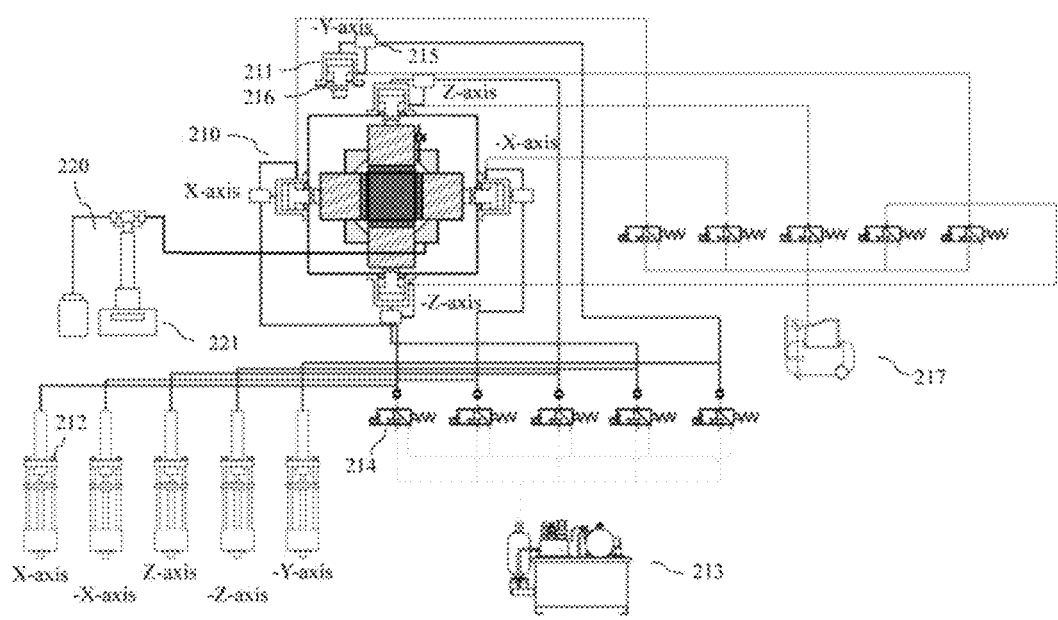
FIG. 4 is a schematic structural diagram of a triaxial stress and confining pressure loading system according to the present application.

The triaxial stress and confining pressure loading system 200 is configured to provide triaxial stress and a main pressure chamber pressure (rock sample confining pressure) to the rock sample. It is applicable to a rock sample up to 300 mm×300 mm×300 mm in size. The triaxial stress and confining pressure loading system 200 is capable of applying triaxial stress on five faces, with a maximum loading stress of 80 MPa, and provides a confining pressure power for the rock sample sealing, heating, and insulation system, with a maximum confining pressure of 65 MPa. As shown in FIG. 4, the triaxial stress and confining pressure loading system 200 consists of two units: the triaxial stress loading unit 210 and the confining pressure loading unit 220.

For example, in an embodiment of the physical simulation experiment system for vapor-liquid multiphase seepage in the UGS facility in the depleted gas reservoir, as shown in FIGS. 1 and 4, the triaxial stress loading unit 210 includes loading cylinders 211 positioned around the rock sample, a servo loading pump 212 that provides a power source for the loading cylinders 211, a servo oil source 213 that offers pre-pressurization for axial loading, a servo valve 214 that controls a hydraulic pressure of the loading cylinders 211, a directional control valve 215 that controls a piston movement direction of the loading cylinders 211, a displacement sensor 216 that controls displacement of the loading cylinders 211, and an air compressor 217 that supplies a low-pressure power to reset pistons of the loading cylinders 211; loading heads 2111 of the loading cylinders 211 press against the loading plates 113 around the rock sample respectively; a section of the rock sample is in close contact with a loading surface and interfaces with the loading heads 2111 of the loading cylinders 211 of the external triaxial stress loading unit 210; and the confining pressure loading unit 220 includes a high-precision constant flow/pressure pump 221 connected to the main pressure chamber 111 via a pipeline to provide a constant pressure within the main pressure chamber 111, thereby applying a confining pressure to the rock sample.

Specifically, the triaxial stress loading unit 210 mainly fulfills the system's requirement for triaxial stress loading. As shown in FIGS. 2-3, the loading cylinders 211 mainly provide the complete machine with triaxial stress loading on five faces (X-axis, -X-axis, -Y-axis, Z-axis, -Z-axis). The Y-axis is a fixed axis, using a top plate 218 to apply a counteracting force. The present application selects bidirectional servo loading cylinders 211 with a maximum loading capacity of 800 tons, a cylinder bore of 360 mm, and a working pressure of 80 MPa, the loading cylinders 211 are mounted on a hollow square-shaped high-strength loading frame of a combined integral portal frame structure, providing a maximum test force of 8,000 kN, and the loading cylinders 211 are pre-pressurized using the servo oil source 213 (servo hydraulic source), with pressure loading controlled by the high-pressure servo loading pump 212; the servo loading pump 212 mainly supplies a power source for the triaxial loading cylinders 211, and the present application utilizes a KDHB-500D type servo loading pump, which has a single cylinder volume of 500 mL, a working pressure of 80 MPa, a pressure accuracy of 0.1% F.S, a flow rate range of 0.1 to 150 mL/min, and a flow velocity accuracy of ±1% of a set value; the servo oil source 213 mainly provides pre-pressurization for axial loading to ensure the stability of subsequent pressure loading by the servo loading pump and includes the following main functional elements: a hydraulic pump, a motor, an accumulator, a liquid level meter, an oil filter, an air filter, an oil source control cabinet, a pressure control system, and various valves and valve bank modules, and it has a maximum flow rate of 300 L/min, a maximum oil supply pressure of 31.5 MPa, and a pressure adjustment range of 0 to 25 MPa; the servo valve 214 mainly controls the hydraulic pressure of the loading cylinders 211, and the present application selects a Moog D633-308B direct-acting servo valve, with a flow range of 3.8 to 100 L/min, a maximum working pressure of 35 MPa, and a response time of 5 ms; the directional control valve 215 mainly controls the piston movement direction of the loading cylinders 211, enabling the loading cylinders 211 to perform work in both directions, and the present application selects a Rexroth 4WE 10 E33/CG24N9K4/V type directional control valve; the displacement sensor 216 is mainly used for displacement control of the loading cylinders 211, providing high-precision (0.01% F.S) direct or absolute position detection feedback, and it employs a magnetostrictive displacement sensor, which has advantages such as high response frequency, fast refresh rate, strong anti-interference capability, minimal hysteresis, and high accuracy; the air compressor 217 mainly supplies a low-pressure power for the loading cylinders 211 to reset the pistons of the loading cylinders 211; and the confining pressure loading unit 220 mainly utilizes the high-precision constant flow/pressure pump 221 and is connected to the main pressure chamber 111 via a pipeline to provide a constant pressure within the main pressure chamber, i.e., to provide a confining pressure for the rock sample, and the pump has a single cylinder volume of 100 mL, a flow rate range of 0.01 to 100 mL/min, a working pressure of 70 MPa, and a pressure measurement resolution of 0.001 MPa.

The oil-gas-water injection and pore pressure supply system 300, consisting of the vapor-phase injection unit 310 and the liquid-phase injection unit 320, is used for providing oil-gas-water three-phase injection into the rock sample, especially for the constant pressure/flow injection of combustible gases, the simulation of storage well injection and withdrawal, and the development and modification of oil and gas wells; and it also supplies an oil-gas-water three-phase pore pressure, simulating the supply of in-situ formation pore pressure and finite/infinite-boundary formation fluids (edge and bottom aquifer, residual oil, and gas).

For example, in an embodiment of the physical simulation experiment system for vapor-liquid multiphase seepage in the UGS facility in the depleted gas reservoir, as shown in FIG. 1, the vapor-phase injection unit 310 is connected to the rock sample via a pipeline and includes a gas booster pump set 311 connected via a pipeline for supplying a high-pressure gas at an input end, a high-pressure gas storage vessel 312 for storing the high-pressure gas, an air compressor 313 for supplying power to the gas booster pump set 311, a pneumatic pressure controller 314 for controlling a gas pressure, and a gas flow controller 315 for controlling a gas flow rate.

Specifically, the gas booster pump set 311 supplies a high-pressure gas at an input end, which is then stored in the high-pressure gas storage vessel 312. The gas booster pump set 311 is powered by the air compressor 313, and the gas pressure is controlled by the pneumatic pressure controller 314. ATESCOM ER5000 electronic pressure controller is selected and can be controlled through a computer or PLC, enabling integrated management and control. The gas flow rate is controlled by the gas flow controller 315, and an AST10-HBC digital mass flow meter, consisting of a mass flow sensor, a laminar flow stratification component, a flow controller regulating valve, and an amplification control circuit, is selected by the present application to carry out digital signal input and output as well as flow control.

For example, in an embodiment of the physical simulation experiment system for vapor-liquid multiphase seepage in the UGS facility in the depleted gas reservoir, as shown in FIG. 1, the liquid-phase injection unit 320 is connected to the rock sample via a pipeline and includes a liquid constant-flow and constant-pressure pump 321 and a piston container 322, both connected via a pipeline, where the piston container 322 is configured to isolate a working fluid from an injected fluid.

Specifically, liquid-phase injection is achieved by the liquid constant-flow and constant-pressure pump 321, and the piston container 322 is added to isolate a working fluid from an injected fluid, thereby protecting the liquid constant-flow and constant-pressure pump 321. The present application utilizes a KDHB-200 type high-precision injection pump, which features a single cylinder volume of 200 mL, a working pressure of 60 MPa, a pressure accuracy of 0.10% F.S, a flow rate range of 0.01 to 80 mL/min, and a flow velocity accuracy of ±1% of a set value.

The vapor-liquid-solid three-phase separation and measurement system 400, consisting of the back-pressure unit 410, the solid separation and measurement unit 420, and the vapor-liquid separation and measurement unit 430, is configured to separate and measure key data such as the discharge rates and cumulative discharge amounts of gas, liquid, and solid phases in physical simulation experiments of formation fluid migration-displacement and sand production from the wellbore.

For example, in an embodiment of the physical simulation experiment system for vapor-liquid multiphase seepage in the UGS facility in the depleted gas reservoir, as shown in FIG. 1, the back-pressure unit 410 includes a back-pressure pump 411, a back-pressure container 412, and a back-pressure valve 413, all connected via a pipeline; the solid separation and measurement unit 420 is disposed between the outlet end of the rock sample and the back-pressure valve 413 and includes a solid collection and measurement container 421 for separating solids; and the vapor-liquid separation and measurement unit 430 is connected to the back-pressure valve 413 and includes a vapor-liquid separator 431 for performing vapor-liquid separation on a fluid from the outlet end of the rock sample, where a separated gas is discharged through a top outlet of the vapor-liquid separator 431 and passes through a drying tank 432 to enter either a high-speed gas flow meter 433 or low-speed gas flow meter 434 for vapor-phase flow measurement, a separated liquid is discharged through a bottom outlet of the vapor-liquid separator 431 and passes through an oil-water separation tube 435 to enter either an oil-phase metering pump 436 for oil-phase flow measurement or a water-phase metering pump 437 for water-phase flow measurement, and an oil-water interface detector 438 is arranged on the oil-water separation tube 435.

Specifically, the back-pressure unit 410, acting as a pressure regulating device, is configured to apply a pressure higher than atmospheric pressure and up to a simulated pore pressure at the outlet end of the rock sample, mainly for stabilizing effluent liquids, preventing evaporation, and improving the measurement accuracy; the solid collection and measurement container 421 is configured to separate and measure solids, preventing sand particles from clogging the metering pipeline, and is installed between the outlet end of the rock sample and the back-pressure valve 413; the vapor-liquid separator 431 is mainly configured to separate gases and liquids from fluids at the outlet end of the rock sample, where the fluids are separated by an umbrella-shaped spiral separator, with gases exiting through an upper outlet and being measured by a gas metering device, and liquids flowing out from a bottom outlet to an oil-water metering device; the drying tank 432 is configured to dry liquid components carried in gases, ensuring the accuracy of gas measurement and also serving to protect the gas flow meter, and it is made of stainless steel, contains a desiccant inside, and has an effective volume of 500 mL; the automatic oil-water metering device utilizes the principle of gravity separation, separating oil and water in the liquid phase through the oil-water separator 431, and measures the flow rates of the oil phase and the water phase separately using the oil phase metering pump 436 and the water phase metering pump 437; and the gas flow meter is configured for gas phase flow measurement and can be divided into the high-speed gas flow meter 433 and the low-speed gas flow meter 434 based on the flow rate.

The optical micro/nanofiber gas detection and monitoring system 500 is configured to detect and rapidly respond to the leakage of specified gases, so as to assess the timeliness of inter-well fluid migration in a physical model and to analyze dominant migration pathways.

For example, in an embodiment of the physical simulation experiment system for vapor-liquid multiphase seepage in the UGS facility in the depleted gas reservoir, as shown in FIG. 1, the optical micro/nanofiber gas detection and monitoring system 500 includes a gas probe 510 arranged inside the rock sample and a signal conditioner 520 electrically connected to the gas probe 510.

Specifically, the optical micro/nanofiber gas detection and monitoring system 500 consists of an optical fiber photothermal spectroscopy-based $CH_4$ sensor based on an all-optical fiber system and a stimulated Raman spectroscopy-based $H_2$ sensor based on an all-optical fiber system.

The distributed fiber optic sensing system 600, consisting of OSI-C type ultra-high precision distributed fiber optic sensing equipment, is configured to monitor and record internal deformation and fracture initiation of the rock sample during a loading process.

For example, in an embodiment of the physical simulation experiment system for vapor-liquid multiphase seepage in the UGS facility in the depleted gas reservoir, as shown in FIG. 1, the distributed fiber optic sensing system 600 includes a light source 610, a coupler 620, a detector 630, and optical fibers 640, all connected electrically, and the optical fibers 640 are embedded inside the rock sample.

Specifically, the distributed fiber optic sensing system 600 is based on the optical frequency domain reflectometry (OFDR) technology and utilizes a single-mode optical fiber as the sensor. By measuring the changes in the position and intensity of Rayleigh scattering signals, it deduces the strain distribution along the entire length of the optical fiber and can achieve a spatial resolution of up to 1 mm within a sensing range of 50 m, with a strain measurement range from −12,000 to +12,000 με and a strain measurement accuracy of ±0.1° C./1.0 με.

The gas supply and leakage alarm system 700 is configured to provide centralized gas supply for experimental setups and ensure their safe and reliable operation.

Figure 5:
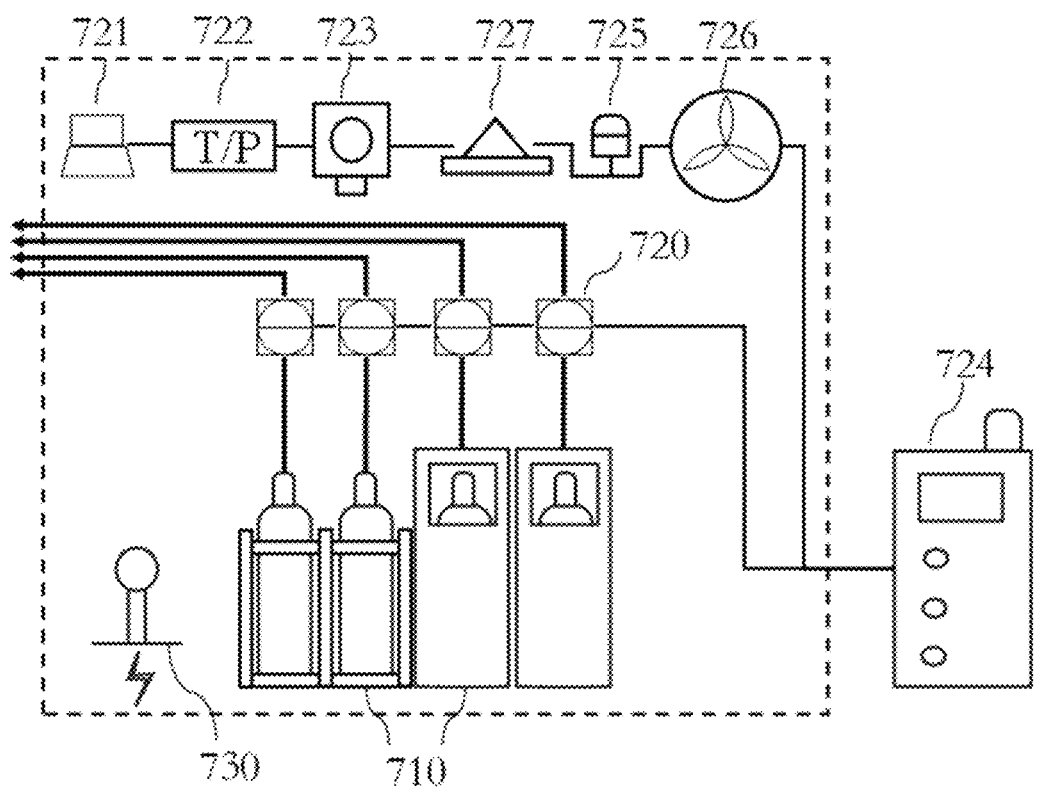
FIG. 5 is a schematic structural diagram of a gas supply and leakage alarm system according to the present application.

For example, in an embodiment of the physical simulation experiment system for vapor-liquid multiphase seepage in the UGS facility in the depleted gas reservoir, as shown in FIG. 5, the gas supply and leakage alarm system 700 includes a gas cylinder rack 710 for holding gas cylinders, a solenoid valve 720 arranged on a gas cylinder outlet pipeline, and a gas monitor 721, temperature/pressure sensors 722, a video monitor 723, a central monitoring server 724, an alarm 725, ventilation equipment 726, and fire extinguishing equipment 727, all connected to the solenoid valve 720 via wiring, and an electrostatic protection device 730 is arranged in a gas cylinder storage room.

Specifically, the gas supply and leakage alarm system 700 can centrally store gas source cylinders, isolating them from fire sources and physical impacts or falling damage. It is equipped with the electrostatic protection device 730 to provide static elimination and protection, preventing the occurrence of electrostatic sparks. Meanwhile, the gas supply and leakage alarm system 700 is also equipped with various sensors for exception monitoring. When the gas monitor 721 detects a gas leak from the cylinders or the concentration of evolved gases (especially flammable and explosive gases such as $CH_4$ and $H_2$) exceeds the warning threshold, or when the temperature/pressure sensors 722 detect abnormal pressure in the cylinders or abnormal temperature or pressure in the cylinder storage room, or when the video monitor 723 identifies any unusual conditions in the cylinder storage room, the central monitoring server 724 automatically processes the situation. The alarm 725 is triggered and sends a message to emergency personnel. Depending on the severity of the situation, the system controls the solenoid valve 720 to shut off the gas supply, actively activates the ventilation equipment 726 for ventilation, and engages the fire extinguishing equipment 727 to control any hazard promptly, ensuring the safety of both equipment and personnel.

The physical simulation experiment system for vapor-liquid multiphase seepage in the UGS facility in the depleted gas reservoir according to the present application mainly addresses physical simulation experiments for migration, miscibility, displacement, and distribution of multiphase fluids in heterogeneous and discontinuous formations, mixing and leakage of gas components, dynamic stability and failure of geological bodies with complex internal structures, sudden changes in flow characteristics, as well as security issues related to the deformation and collapse of key wellbore components such as casings, perforation tunnels, and cement rings, sand production from the wellbore, and fluid channeling, thereby helping overcome the bottleneck problem of evaluating the dynamic sealing integrity of UGS facilities in depleted gas reservoirs under alternating loads caused by injection and withdrawal, so as to guide the scientific site selection and design of UGS facilities. It holds great significance for advancing China's UGS facility construction and operation capabilities and promoting disciplinary development.

Although the embodiments of the present application are disclosed above, the embodiments are not limited to the applications listed in the specification and the implementation manners but totally can be applied to various fields to which the present application is applicable. For those skilled in the art, other modifications can be easily made. Therefore, without departing from the general concepts defined in the claims and equivalent ranges, the present application is not limited to particular details and illustrations shown and described herein.

What is claimed is:

1. A physical simulation experiment system for vapor-liquid multiphase seepage in an underground gas storage (UGS) facility in a depleted gas reservoir, comprising:
   a rock sample sealing, heating, and insulation system, comprising a rock sample sealing unit for accommodating a rock sample and a heating and insulation unit for heating the rock sample, wherein the rock sample sealing unit comprises a main pressure chamber, a rock sample rubber sleeve, and loading plates; the main pressure chamber has a central cavity for accommodating the rock sample and providing a confining pressure environment for the rock sample; the rock sample rubber sleeve is fitted around an outer wall of the rock sample to seal the rock sample; and the loading plates are arranged around the rock sample respectively and press against the rock sample rubber sleeve on the outer wall of the rock sample;
   a triaxial stress and confining pressure loading system, comprising a triaxial stress loading unit for applying triaxial stress to the rock sample and a confining pressure loading unit for applying a confining pressure to the rock sample, wherein the triaxial stress loading unit comprises loading cylinders positioned around the rock sample, a servo loading pump that provides a power source for the loading cylinders, a servo oil source that offers pre-pressurization for axial loading, a servo valve that controls a hydraulic pressure of the loading cylinders, a directional control valve that controls a piston movement direction of the loading cylinders, a displacement sensor that controls displacement of the loading cylinders, and an air compressor that supplies a low-pressure power to reset pistons of the loading cylinders; loading heads of the loading cylinders press against the loading plates around the rock sample respectively; and the confining pressure loading unit comprises a high-precision constant flow/pressure pump connected to the main pressure chamber via a pipeline to provide a constant pressure within the main pressure chamber, thereby applying the confining pressure to the rock sample;
   an oil-gas-water injection and pore pressure supply system connected to an inlet end of the rock sample via a pipeline, comprising a vapor-phase injection unit and a liquid-phase injection unit to perform oil-gas-water three-phase injection into the rock sample;
   a vapor-liquid-solid three-phase separation and measurement system connected to an outlet end of the rock sample via a pipeline, comprising a back-pressure unit, a solid separation and measurement unit, and a vapor-liquid separation and measurement unit;
   an optical micro/nanofiber gas detection and monitoring system, configured to detect leakage of specified gases;

a distributed fiber optic sensing system, configured to monitor and record internal deformation and fracture initiation of the rock sample during a loading process; and a gas supply and leakage alarm system, configured to provide safe and reliable centralized gas supply;

wherein the heating and insulation unit comprises:

heating rods embedded around an interior of the main pressure chamber to heat the main pressure chamber and transfer heat to the rock sample; and a flexible insulation jacket wrapped around an exterior of the main pressure chamber to provide thermal insulation and temperature compensation for the main pressure chamber.

2. The physical simulation experiment system for vapor-liquid multiphase seepage in the UGS facility in the depleted gas reservoir of claim 1, wherein the vapor-phase injection unit is connected to the rock sample via a pipeline and comprises a gas booster pump set connected via a pipeline for supplying a high-pressure gas at an input end, a high-pressure gas storage vessel for storing the high-pressure gas, an air compressor for supplying power to the gas booster pump set, a pneumatic pressure controller for controlling a gas pressure, and a gas flow controller for controlling a gas flow rate.

3. The physical simulation experiment system for vapor-liquid multiphase seepage in the UGS facility in the depleted gas reservoir of claim 2, wherein the liquid-phase injection unit is connected to the rock sample via a pipeline and comprises a liquid constant-flow and constant-pressure pump and a piston container, both connected via a pipeline, and the piston container is configured to isolate a working fluid from an injected fluid.

4. The physical simulation experiment system for vapor-liquid multiphase seepage in the UGS facility in the depleted gas reservoir of claim 1, wherein the back-pressure unit comprises a back-pressure pump, a back-pressure container, and a back-pressure valve, all connected via a pipeline; the solid separation and measurement unit is disposed between the outlet end of the rock sample and the back-pressure valve and comprises a solid collection and measurement container for separating solids; and the vapor-liquid separation and measurement unit is connected to the back-pressure valve and comprises a vapor-liquid separator for performing vapor-liquid separation on a fluid from the outlet end of the rock sample, wherein a separated gas is discharged through a top outlet of the vapor-liquid separator and passes through a drying tank to enter either a high-speed or low-speed gas flow meter for vapor-phase flow measurement, a separated liquid is discharged through a bottom outlet of the vapor-liquid separator and passes through an oil-water separation tube to enter either an oil-phase metering pump for oil-phase flow measurement or a water-phase metering pump for water-phase flow measurement, and an oil-water interface detector is arranged on the oil-water separation tube.

5. The physical simulation experiment system for vapor-liquid multiphase seepage in the UGS facility in the depleted gas reservoir of claim 1, wherein the optical micro/nanofiber gas detection and monitoring system comprises a gas probe arranged inside the rock sample and a signal conditioner electrically connected to the gas probe.

6. The physical simulation experiment system for vapor-liquid multiphase seepage in the UGS facility in the depleted gas reservoir of claim 1, wherein the distributed fiber optic sensing system comprises a light source, a coupler, a detector, and optical fibers, all connected electrically, and the optical fibers are embedded inside the rock sample.

7. The physical simulation experiment system for vapor-liquid multiphase seepage in the UGS facility in the depleted gas reservoir of claim 1, wherein the gas supply and leakage alarm system comprises a gas cylinder rack for holding gas cylinders, an electromagnetic valve arranged on a gas cylinder outlet pipeline, and a gas monitor, temperature/pressure sensors, a video monitor, a central monitoring server, an alarm, ventilation equipment, and fire extinguishing equipment, all connected to the electromagnetic valve via wiring, and an electrostatic protection device is arranged in a gas cylinder storage room.

* * * * *